United States Patent [19]

Garvey

[11] 4,401,207
[45] Aug. 30, 1983

[54] PRODUCT ACCUMULATOR

[75] Inventor: Francis J. Garvey, Newfield, N.J.

[73] Assignee: Garvey Corporation, Blue Anchor, N.J.

[21] Appl. No.: 228,360

[22] Filed: Jan. 26, 1981

Related U.S. Application Data

[63] Continuation of Ser. No. 970,819, Dec. 18, 1978, abandoned.

[51] Int. Cl.³ .............................................. B65G 37/00
[52] U.S. Cl. ................................... 198/580; 198/453
[58] Field of Search ....................... 198/447, 453-455, 198/580, 347

[56] References Cited

U.S. PATENT DOCUMENTS

| | | |
|---|---|---|
| 2,003,097 | 5/1935 | Vickery . |
| 2,763,359 | 4/1936 | Rose .................................... 198/455 |
| 3,104,753 | 9/1963 | Osborne ............................... 198/580 |
| 3,176,821 | 4/1965 | Eldred et al. .................... 198/453 X |
| 3,342,012 | 9/1967 | Reading . |
| 3,604,551 | 9/1971 | Fink . |
| 4,037,710 | 7/1977 | Brutcher ......................... 198/580 X |

FOREIGN PATENT DOCUMENTS 6405766 11/1965 Netherlands ....................... 198/447

Primary Examiner—John J. Love
Assistant Examiner—Douglas D. Watts
Attorney, Agent, or Firm—Anthony A. O'Brien

[57] ABSTRACT

A product accumulator for a conveyor system includes a movable through-lane belt having an in-feed end and an out-feed end, at least one first auxiliary belt disposed adjacent the through-lane belt and movable in the same direction, and at least one second auxiliary belt disposed adjacent the through-lane belt and movable in the opposite direction, adjustable stationary guides, one guide disposed adjacent one end of the first auxiliary belt near the out-feed end of the through-lane belt to guide product from the first auxiliary belt onto the through-lane belt, and another guide disposed adjacent one end of the second auxiliary belt near the in-feed end of the through-lane belt, to guide product from the second auxiliary belt onto the through-lane belt, said guides disposed closely above the belts and arranged to move product from belt to belt whenever product is prevented from moving along the out-feed end of the through-lane belt.

4 Claims, 4 Drawing Figures

PRODUCT ACCUMULATOR

CROSS-REFERENCE TO RELATED APPLICATION

This is a continuation application of parent application Ser. No. 970,819 filed Dec. 18, 1978, now abandoned.

BACKGROUND OF THE INVENTION

The present invention relates to a product accumulator for use with a conveyor belt or similar article handling device and is particularly intended for re-circulating items carried on a through-lane belt.

The accumulator of the present invention has particular application and use in connection with cans or similar cylindrical products, such as rolls of toilet paper and the like, but is also usable with bottles (such as soft drinks or beer) or non-circular products as will be hereinafter described.

Article flow-control device unscrambling apparatus, and accumulators per se for conveyor belts are not new, and attention is directed to U.S. Patents Vickery U.S. Pat. No. 2,003,097, Osborne U.S. Pat. No. 3,104,753, Reading U.S. Pat. No. 3,342,012, Fink U.S. Pat. No. 3,604,551, and Brutcher U.S. Pat. No. 4,037,710.

It is evident that others have tried to provide an accumulator or storage space in connection with a moving conveyor belt, wherein the products carried on the belt can be temporarily stored in the event that the take-off or out-feed portion of the conveyor belt is temporarily blocked or stopped, or if the products are, for some reason, prevented from moving along the conveyor line.

It is important that the accumulator operate in such a manner that as the products arrive at the in-feed end of the accumulator (when the out-feed end is jammed or for any reason the products do not flow along the conveyor) that they be moved or circulated so as to prevent a product "lock-up" which would prevent the products from moving along the conveyor at the out-feed end once the jam or stoppage is removed.

It is particularly advantageous that these accumulators be placed selectively along a conveyor belt, and that the conveyor system need not be modified substantially to adapt the placement of the accumulator therealong.

SUMMARY OF THE INVENTION

The accumulator of the present invention includes a table-like support (having a center lane or through-lane conveyor belt portion which can be aligned with an existing conveyor belt, or which may be placed in a position to straddle an existing conveyor belt) so that a central, through-lane belt is provided in the middle of the table. On either side of the center lane, a plurality of auxiliary belts are placed, all auxiliary belts on one side moving in one direction and all on the other side moving in the opposite direction. Suitable guides, one at each end of the through-lane belt guide the products or articles so that a circulatory motion is provided for the articles, so that the articles move from belt to belt and thus a lockup or jamming is prevented.

The accumulator of the present invention is relatively uncomplicated in design and construction, and operates on a rotary or circulatory principle which assures that the products will not be blocked in the accumulator and will always be available for discharge when the outfeed is open to carry products away.

Hence, a principle object of the present invention is to provide a rotary accumulator for temporarily storing products on both sides of a conveyor belt.

A further object of the present invention is to provide a non-blocking accumulator which can function with an existing conveyor system and which can be adjusted for handling objects of various sizes and various configurations and is not limited to handling products with a circular cross-section.

An additional object of the present invention is to provide a conveyor belt accumulator which does not require sophisticated guide rails, complicated guide vanes, or driven helper devices to insure the circulating of the product in the accumulator.

With the above and other objects in view, a better understanding of the present invention will be achieved by reference to the following detailed description.

DETAILED DESCRIPTION

For the purpose of illustrating the present invention, there is shown in the accompanying drawings a form thereof which is at present preferred, although it is to be understood that the various instrumentalities of which the invention consists can be variously arranged and organized and that the invention is not limited to the precise arrangements and organizations of the instrumentalities as herein shown and described.

In the drawings, wherein like reference characters indicate like parts:

Figure 1:
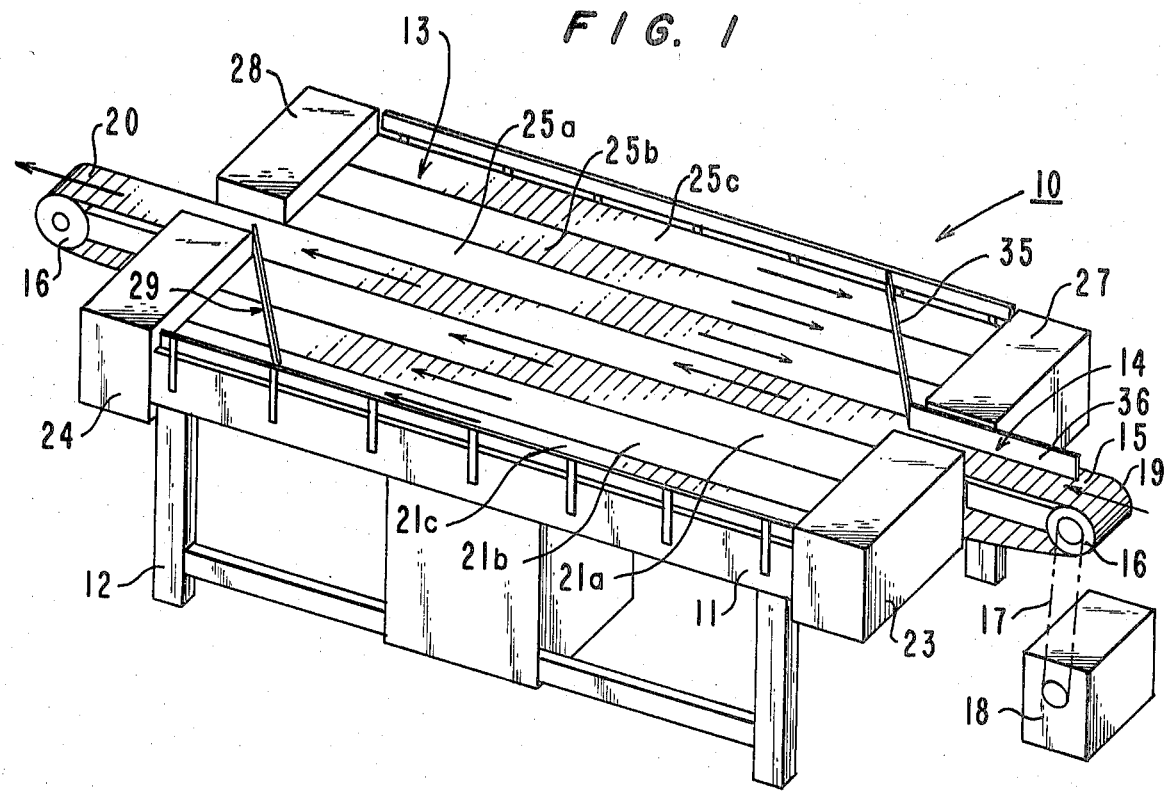
FIG. 1 is a perspective view of the accumulator of the present invention with arrows indicating the relative movement of the belts or traveling table-portions of the accumulator.

In FIG. 1, the accumulator 10 is seen to include a generally table-like portion 11 having a plurality of legs 12 which support an upper-working surface 13. The accumulator 10 may be constructed and arranged with a central slot-like portion 14, through which a through-line conveyor belt 15 passes. The conveyor belt 15 may be mounted in appropriate guides, such as the rollers 16, and driven by suitable means 17 from a motor or power sources 18. In this configuration, which is the preferred embodiment, the accumulator may be disposed so that the through-lane belt 15 is aligned with another conveyor belt (not shown) at the in-feed end 19, and another conveyor belt (not shown) aligned with the outfeed end 20 of the belt 15. Thus, objects which are conveyed from another belt to the in-feed end 19 of this accumulator will pass directly onto the belt 15 and be carried therealong through the accumulator and out the out-feed end 20 and onto another conveyor belt. This continues as long as the out-feed end 20 is not blocked by back-up of product or in any way closed so that the objects which arrive at the in-feed end 19 cannot pass out through the out-feed end 20.

At this point, it is seen that the accumulator, with its through-lane 15, acts merely as a continuation of another portion of a conveyor belt system.

In another embodiment, the through-lane belt 15 may be removed and the table 11 may be positioned beneath an existing belt (not shown) so that the accumulator 10 will operate with such existing belt in the manner described hereafter.

It is well understood in this art that there are times when the objects carried along the conveyor become jammed or when removal from the end of the conveyor is not done at a rate as fast as in the in-feed and, therefore, the products jam-up or accumulate along the conveyor belt. At this point the accumulator of the present invention acts to provide temporary storage or accumulator space until the discharge end is free of any occlusion and the objects are permitted to move outwardly through the discharge end 20.

This is accomplished in the following manner:

On the table-like surface 13, on one side of the through-lane 15, a plurality of belts or moving surfaces 21-a, 21-b and 21-c are disposed in such a manner as to provide a generally flat surface co-planar with the top of the through-lane conveyor belt 15. Each of these belts 21-a, b and c move in the same direction as shown in the arrows 22-a, b, and c in FIG. 2.

These belts 21-a, b, and c can be driven by suitable mechanism (not shown) within the housings 23 and 24. Such mechanism may be suitably connected to the motor 18 and drive mechanism for the through-lane belt 15, or may be independently driven by additional motors (not shown). The belts 21-a, b, and c may be driven at the same linear speed as the through-lane belt 15 or may bbe driven at selectively different speeds, depending upon the motor to be imparted to the objects accumulating on the table.

On the opposite side of the through-lane conveyor belt 15, additional belts 25-a, b, and c are disposed to create a further extension of the planar surface of the top of through-lane belt 15, and these belts 25-a, b, and c move in a direction opposite to the belts 21-a, b, and c as shown by the arrows 26-a, b, and c.

The belts 25-a, b, and c are driven by suitable mechanism (not shown) contained within the housing 27 and 28, either by the motor 18 or by independent power sources contained within the housings 27 and 28.

As is evident from the preceding description, any objects placed upon the belts 21-a, b, and c will be moved from the in-feed end of the accumulator toward the out-feed end thereof, whereas any objects disposed on the belts 25-a, b, and c will be moved from the discharge end toward the in-feed end of the accumulator. A planar horizontal accumulating area for objects is formed by the upper surfaces of the conveyors 15, 21a, 21b, 21c, 25a, 25b and 25c.

Suitably arranged on the top of the accumulator 10, near the down-stream or out-feed end of the belts 21-a, b, and c is an inclined bracket or guide 29. This bracket or guide has its angled portion 30 disposed above the belts 21-a, b, and c so that the belts may pass therebeneath and so that the angled portion 30 will move the objects toward the through-lane belt 15 and toward the out-feed 20, as is shown particularly in FIG. 3. A guide-portion 31 extends along the through-lane belt 15 and outwardly toward the out-feed end 20, from the bracket corner 32, and is suitably mounted adjacent the housing 24, so that this guide may be moved downstream toward the out-feed as is shown particularly in FIG. 1, or upstream toward the in-feed end, as is shown in FIG. 2, or even further upstream, as is shown in FIG. 4, to accommodate objects of different sizes and shapes.

On the opposite side of the table from the guide 29 is another guide 33 with an extension 34 supported by the housing 28 and longitudinally movable upstream or downstream to provide a matching or mating guide member for the guide 29 so as to insure the prevention of any lockup or jamming of the products guided along the arm 30 of the guide 29 toward the discharge opening between the extensions 31 and 34. The termination 32 of the angled guide 30, as shown in FIGS. 3 and 4, is spaced upstream from the output opening to prevent jamming.

A guide bracket 35, similar to the bracket 29, is disposed at the in-feed end of the table, and overlying the belts 25-a, b, and c. This guide has an extension 36 which may be mounted on the housing 27 for adjustment similar to the adjustment of the guide 29. Similarly, another bracket 37, similar to the bracket 33, with an extension 38, is mounted on the housing 23 to provide a co-relative adjustment with the guide 35 to prevent jamming of the products at the in-feed end of the accumulator. Such products are moved toward that end by the belts 25-a, b, and c. The termination point 50 of the angled guide 35, as shown in FIG. 3, is spaced downstream from the input opening for products entering the accumulating area to prevent jamming.

Figure 2:
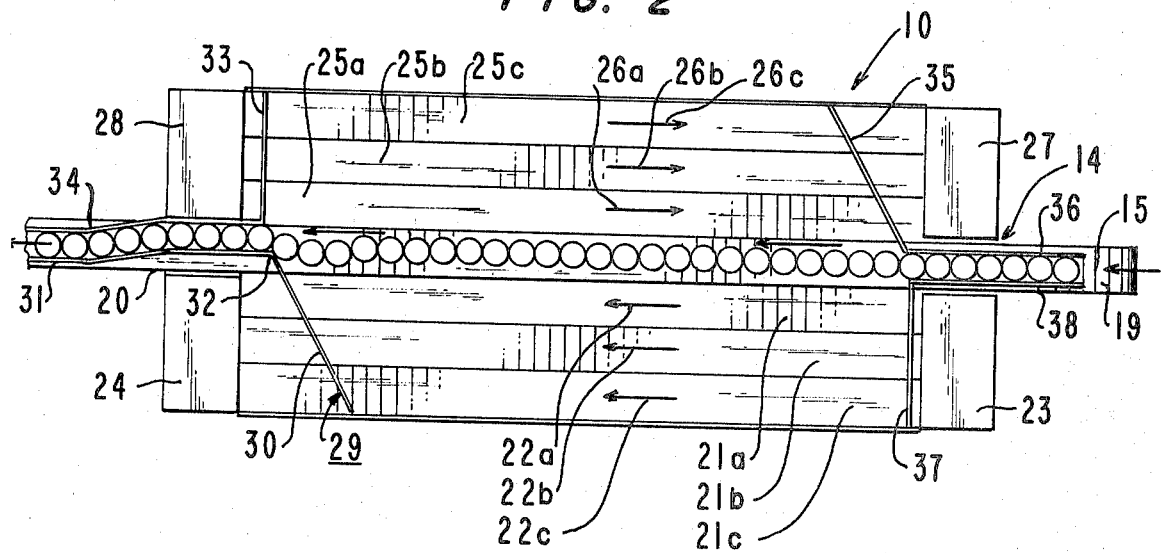
FIG. 2 is a top-plan view of the accumulator of FIG. 1 illustrating particularly the movement of the product along the central through-line belt when products are moving normally through the outfeed of the conveyor system.

As can be clearly seen in the FIG. 2 illustration, as long as the products can move freely along the through-lane conveyor 15, through the accumulator from the in-feed end to the out-feed end thereof, the products will stay on the through-lane belt 15 and move directly through the accumulator without passing onto any of the belts 21-a, b, and c or 25-a, b, and c.

Figure 3:
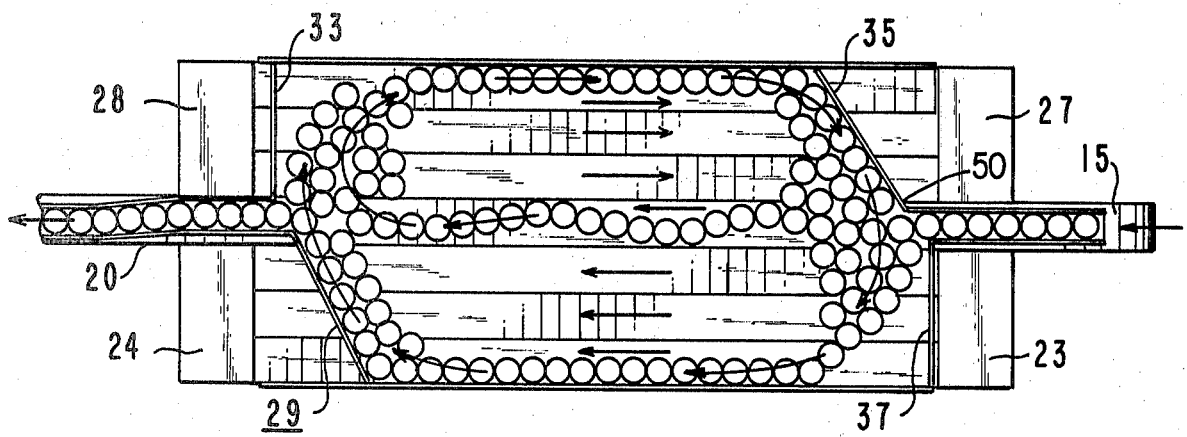
FIG. 3 is a top-plan view, similar to FIG. 2, showing the motion of the products in the accumulator when the out-feed lane is blocked and products continue to arrive at the in-feed end of the accumulator.
Figure 4:
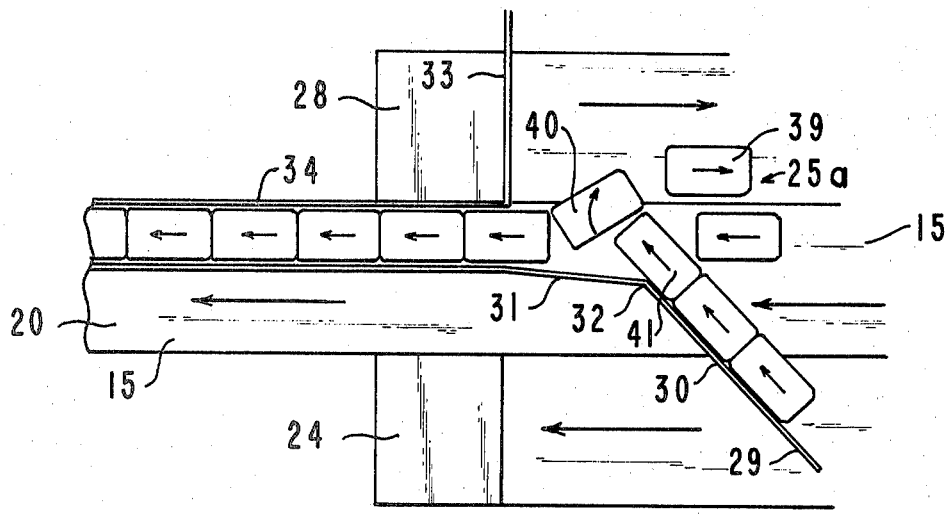
FIG. 4 is a fragmentary top plan view of the out-feed end of the accumulator of the present invention, showing how the guide can be adjusted to accommodate non-circular products.

However, when the out-feed end becomes blocked because products cannot move along the through-lane conveyor 15 and out the out-feed end 20, the products will accumulate on the through-lane conveyor between the guides 31 and 34, as shown in FIG. 3, whereupon additional products brought in by the through-lane conveyor 15 will be guided from belt 15 onto the auxiliary belt 25-a. At this point, they may move toward the in-feed end on belt 25-a, or may be forced by additional incoming products onto the auxiliary belts 25-b or 25-c. In any event, the incoming products will be kept within the confines of the accumulating area or tabletop 13 of the accumulator, generally circulating back toward the in-feed end 19. When products have moved along the auxiliary belts 25-a, b, and c to strike the guide 35, they will be urged toward the through-lane conveyor 15 whereupon they will strike the incoming products, forcing them onto the auxiliary belts 21-a, b, or c depending upon the quantity of products accumulated. Additional incoming products will move into this circulatory pattern, which is illustrated in FIG. 3, and the products kept within the accumulator will continue to circulate until the out-feed end of the accumulator is unblocked, or the products are free from any jamming, and start to move outwardly along through-lane conveyor belt 15 to the out-feed 20. Thereafter, any product on the through-lane conveyor 15 will move directly outward and, as the belts 22-a, b, c and 25-a, b, and c continue to feed the products on to the through-lane conveyor 15, under the impetus of the guides 29 and 35, sooner or later all of the products accumulated on the table-top 13 will be carried outwardly through the out-feed 20 by the through-lane conveyor belt 15.

As is illustrated particularly in FIG. 4, the guides 29 and 33 may be adjusted by sliding the extensions 31 and 34 relatively along the length of the through-lane conveyor 15 so that the corner 32 between the portions 30 and 31 of the guide 29 may be located appropriately with regard to the guide 33 so as to accommodate non-circular products. As is seen in FIG. 4, the rectangular products 39 will normally pass outwardly along the out-feed end 20, but if a stoppage occurs, then a product 40, which is not contained between the extensions 31 and 34 is moved by the products 41 onto the belt 25-a.

As shown in FIGS. 2 and 3, the products exiting single file from the accumulating area at the output thereof are centered on an output line which is parallel to the conveyor 15 and is offset from an input line defined by the centers of products entering single file into the accumulating area at the input thereof. The angled guide 30 at its termination point 32 partially extends into the path of the products being advanced by the conveyor 15 along the input line from the input. Thus products are engaged and moved toward one side upstream from the output to prevent lockup of a line of products which could occur for some products if they extended in the same straight line from input to output of the accumulating area.

The width of the belts and the material of which they are made, as well as the surface pattern or configuration of the belts, can be adapted for the product to be handled on the conveyor. Thus, one may choose smooth belts for some products, and belts with rough surfaces for other products. The belts may be either cloth, rubber, or chain-link, depending upon the type of products to be accommodated, but in any event the upper surfaces of the belts provide a generally planar upper surface for the accumulator so that the products may be easily moved from belt-to-belt and from end-to-end and may slide sideways on the belts as they are moved by the guide, all without any damage to the product or jamming of the product between belts, and all with the intention of insuring that the relatively fluid-like circulatory motion continues on the accumulator as long as the discharge end of the through-lane 15 is stopped-up with product.

It is to be understood that the present invention may be embodied in other specific forms without departing from the spirit of special attributes hereof, and it is, therefore, desired that the present embodiments be considered in all respects as illustrative, and therefore not restrictive, reference being made to the appended Claims rather than to the foregoing description to indicate the scope of the invention.

Having thus described my invention, what I claim as new and desire to protect by Letters Patent are the following:

1. A product accumulator for a conveyor system comprising the combination of
  a through-lane conveyor for moving articles in one direction in the conveyor system,
  first auxiliary conveyor means including at least one first auxiliary conveyor parallel and along a first side of the through-lane conveyor for moving articles in the same direction as the through-lane conveyor,
  second auxiliary conveyor means including at least one second auxiliary conveyor parallel and along a second side opposite the first side of the through-lane conveyor for moving articles in the opposite direction from the through-lane conveyor,
  said conveyors defining a planar accumulating area having input and output sides thereof,
  input guide means over an upstream portion of the through-lane conveyor defining an input opening into the input side of the planar accumulating area,
  output guide means over a downstream portion of the through-lane conveyor defining an output opening from the output side of the accumulating area,
  a first angular guide extending across the first auxiliary conveyor means at the output side of the accumulating area and terminating at a point over the through-lane conveyor wherein the termination point of the first angular guide is spaced upstream from the output opening of the accumulating area for directing articles from the first auxiliary conveyor means to the through-lane conveyor, and
  a second angular guide across the second auxiliary conveyor means at the input side of the accumulating area and terminating at a point over the through-lane conveyor wherein the termination point of the second angular guide is spaced downstream from the input opening of the accumulating area for directing articles from the second auxiliary conveyor means to the through-lane conveyor.

2. A product accumulator as claimed in claim 1 wherein
  the input guide means and the input opening thereof is such that articles enter the accumulating area single file along an input line on the through-lane conveyor, and
  the output guide means and the output opening thereof is such that articles are received single file along an output line on the through-lane conveyor.

3. A product accumulator as claimed in claim 2 wherein
  the input line at the input opening is offset relative to the output line at the output opening.

4. A product accumulator as claimed in claim 3 wherein
  the terminating point of the first angular guide extends partially into the path of articles being advanced by the through-lane conveyor along the input line from the input opening.

* * * * *